(12) United States Patent
Scheps

(10) Patent No.: US 6,775,313 B1
(45) Date of Patent: Aug. 10, 2004

(54) LASER HAVING A TEMPERATURE CONTROLLED SOLID-STATE DYE GAIN ELEMENT

(75) Inventor: Richard Scheps, Rancho Sante Fe, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/349,580

(22) Filed: Jan. 23, 2003

(51) Int. Cl.[7] ................................................. H01S 3/20
(52) U.S. Cl. ............................. 372/54; 372/34; 372/39
(58) Field of Search ............................. 372/54, 39, 34

(56) References Cited

U.S. PATENT DOCUMENTS

| | | | |
|---|---|---|---|
| 5,136,005 A | * | 8/1992 | Hermes ................... 526/292.3 |
| 5,530,711 A | * | 6/1996 | Scheps ......................... 372/20 |
| 5,764,677 A | * | 6/1998 | Scheps ......................... 372/54 |
| 6,243,517 B1 | * | 6/2001 | Deacon ......................... 385/50 |
| 6,263,004 B1 | * | 7/2001 | Arvidsson et al. ............ 372/11 |

* cited by examiner

Primary Examiner—Leon Scott, Jr.
(74) Attorney, Agent, or Firm—Andrew J. Cameron; Michael A. Kagan; Peter A. Lipovsky

(57) ABSTRACT

A laser includes a first optically reflective element; a second optically reflective element opposed to and aligned with the first optically reflective element to define a laser cavity having an optical axis; an optical pump source for injecting optical pump energy into the laser cavity along the optical axis; a solid-state dye gain element having a thin host in which a dye is dissolved that is interposed between said first and second optically reflective elements along the optical axis for transforming the optical pump energy into a resonant optical signal; and a cooling element in thermal contact with the solid-state dye gain element for absorbing heat energy from the solid-state dye gain element to control the temperature of the solid-state dye gain element.

12 Claims, 4 Drawing Sheets

LASER HAVING A TEMPERATURE CONTROLLED SOLID-STATE DYE GAIN ELEMENT

BACKGROUND OF THE INVENTION

Dye lasers, and particularly organic dye lasers, have certain, unique features. Depending on the specific dye in the laser, the output wavelength is tunable over a bandwidth of approximately 100 nanometers. Dye lasers can operate from the ultraviolet to the infrared, and a single laser resonator cavity can be used to cover this entire wavelength range simply by changing dyes and coatings on the intracavity optical components.

Recently, there have been attempts to make dye laser gain elements that incorporate a dye impregnated in a plastic host such as modified polymethyl methacrylate (MPMMA) to provide a solid state laser gain element. MPMMA has excellent optical characteristics (clarity, low number of bubbles and inclusions, surface quality), and when used as a dye host, does not greatly affect the gain and spectral characteristics of the dye. Unfortunately, MPMMA has poor thermal conductivity so that gain elements made of this material can exhibit thermal lensing, thermal distortion, and even melting. Typically, such gain elements are made at room temperature by mixing a certain concentration of the dye with the modified MMA monomer in solution. The mixture is then polymerized to form the solid MPMMA, and the rough form is cut and polished to produce the final shape of the gain element. Because the dye is quite sensitive to high temperature, the manufacturing must take place at temperatures that do not significantly exceed room temperature. Embedding the dye in high melting temperature materials such as glass is therefore not possible. In part, due to these thermal problems, other solid state materials such as porous glass and sol-gels have been used as host structures because they are have a higher thermal conductivity than MPMMA. However, gain elements made of porous glass or sol-gels are more difficult to fabricate and may not provide as much gain compared to plastic hosts. A need therefore exists for a dye laser that uses a solid state host, but which is not subject to the aforesaid thermal problems.

SUMMARY OF THE INVENTION

A laser includes a first optically reflective element; a second optically reflective element aligned with and opposed to the first optically reflective element to define a laser cavity having an optical axis; an optical pump source for injecting optical pump energy into the laser cavity along the optical axis; a thin solid-state dye gain element having a plastic host in which a dye is dissolved that is interposed between said first and second optically reflective elements along the optical axis for transforming said optical pump energy into a resonant optical signal; and a cooling element in thermal contact with the solid-state dye gain element for absorbing heat energy from the solid-state dye gain element to control the temperature of the solid-state dye gain element.

BRIEF DESCRIPTION OF THE DRAWINGS

Throughout the several views, like elements are referenced using like references.

DESCRIPTION OF THE PREFERRED EMBODIMENT

Figure 1:
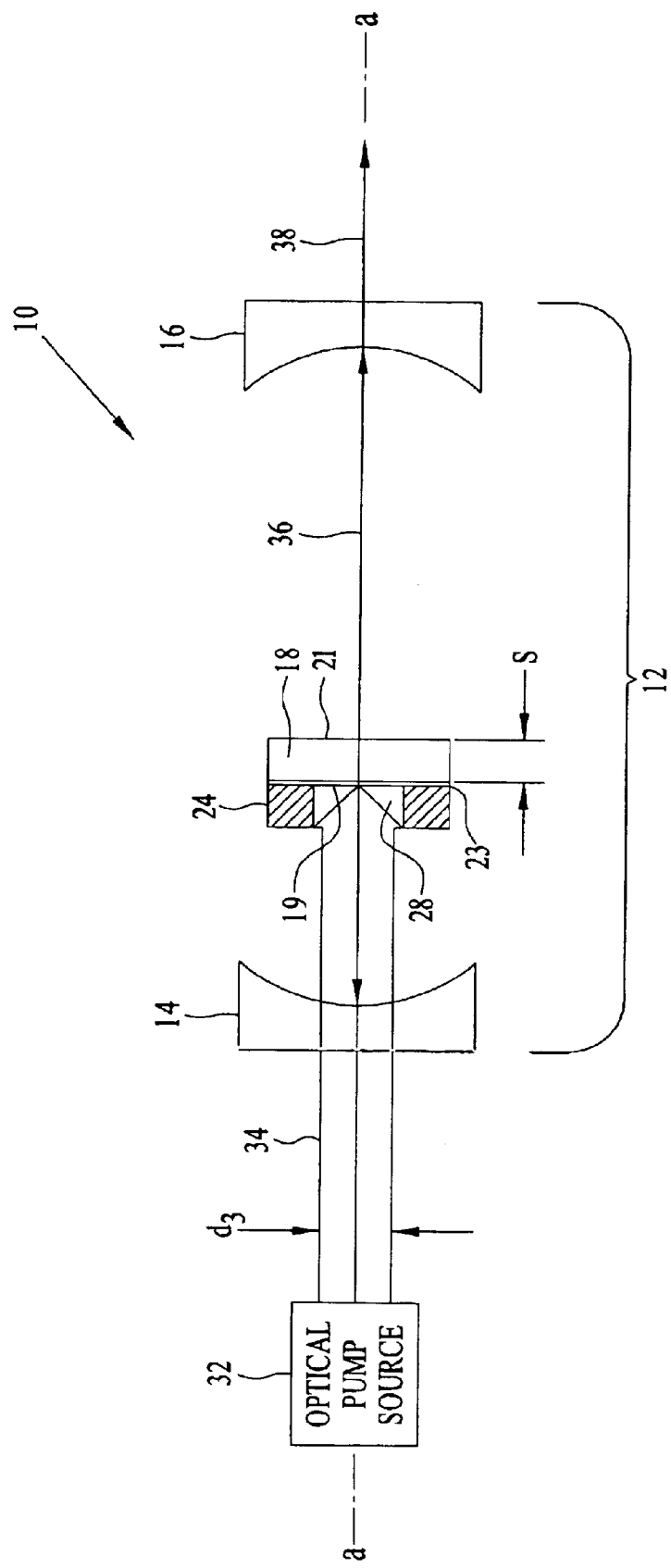
FIG. 1 shows an embodiment of a dye laser that includes a solid-state gain element having one side that abuts a cooling element.

Referring to FIG. 1, there is shown a laser 10 that includes a first optically reflective element 14, a second optically reflective element 16, a solid-state dye gain element 18, a cooling element 24, and an optical pump source 32. The first and second optically reflective elements 14 and 16 are opposed and aligned so as to define an optical resonant ("laser") cavity 12 having an optical axis a—a. Optical pump source 32 generates optical pump energy 34, characterized by a wavelength $\lambda_1$, along optical axis a—a through first optically reflective element 14 which is highly transmissive to optical energy having a center wavelength of $\lambda_1$. Optical pump energy 34 propagates along optical axis a—a and is transformed into an optical signal 36 by solid-state dye gain element 18 which consists of a solid state host material in which a dye is dissolved. Such solid state host materials may be selected from the group that includes plastic, porous glass and sol-gels. Optical signal 36 is characterized by a wavelength $\lambda_2$ that is highly reflected by optically reflective element 14, but only partially reflected by optically reflective element 16. Thus, it may be appreciated that optical signal 36 resonates back and forth between optically reflective elements 14 and 16, and gains energy, or is "amplified" each time it passes through solid-state dye gain element 18. Hence, optical signal 36 may be referenced as "resonant" optical signal 36. Because optically reflective element 16 is partially reflective of optical energy having a center wavelength of about $\lambda_2$, an optical signal 38, which is a fraction of resonant signal 36 is emitted out of the optical resonant cavity 12 through optically reflective element 16 along optical axis a—a.

Still referring to FIG. 1, not all of optical pump energy 34 is transformed into resonant signal 36. In general, a portion of optical pump energy 34 that is not transformed into resonant signal 36 is absorbed as heat energy by solid-state dye gain element 18. However, in application where gain element 18 is made of a plastic material, or other material with low thermal conductivity, the gain element would be vulnerable to thermal lensing, thermal distortion, and even melting. Therefore, the gain element 18 is made very thin so that a cooling element 24 placed in thermal contact with solid-state dye gain element 18 may effectively remove or absorb heat energy from the gain element 18. In one embodiment, gain element 18 may have a thickness S in the range of about 100 to 1000 microns. In another embodiment, gain element 18 may have a thickness in the range of about 100 to 200 microns. The thinness of gain element 18 and thermal contact of gain element 18 with cooling element 24 together are used to control and thereby limit the thermally-induced distortions produced in gain element 18. One way of achieving thermal contact between cooling element 24 and gain element 18 is to have them abut one another. In another embodiment, thermal contact between cooling element 24 and gain element 18 may be enhanced by interposing a thermal grease 23 such as Wakefield thermal compound No. 120 or one of the many thermal grease compounds manufactured under the brand name Apiezon, between them. By way of example, as shown in FIG. 1, cooling element 24 is in thermal contact with a first side 19 of gain element 18. However, in FIG. 2, cooling elements 24 and 26 are shown positioned in thermal contact with both first and second sides 19 and 21, respectively, of gain element 18 to effectuate greater heat transfer from gain element 18 to the cooling elements 24 and 26 than is achievable with just one cooling element.

Still referring to FIG. 1, gain element 18 may be made of a solid state plastic host material such as modified polymethyl methacrylate (MPMMA) in which a dye is dissolved. Examples of dyes suitable for use in conjunction with gain element 18 include rhodamine 700, oxazine 750, DOTCI, and oxazine 725. In one embodiment, the dye concentration in gain element 18 may be established so that the gain element 18 absorbs about 85% of the optical pump energy 34.

Referring to FIG. 1, cooling element 24 may have an aperture 28 generally centered about optical axis a—a so that optical pump energy 34 may be directed to gain element 18, and so that resonant signal 36 may resonate between optically reflective elements 14 and 16. Cooling elements 24 and 26 each may be implemented many different ways, as for example, as a thermoelectric cooler, or as a liquid heat exchanger that employs a liquid which circulates through the heat exchanger to absorb heat energy from the gain element 18.

Figure 3:
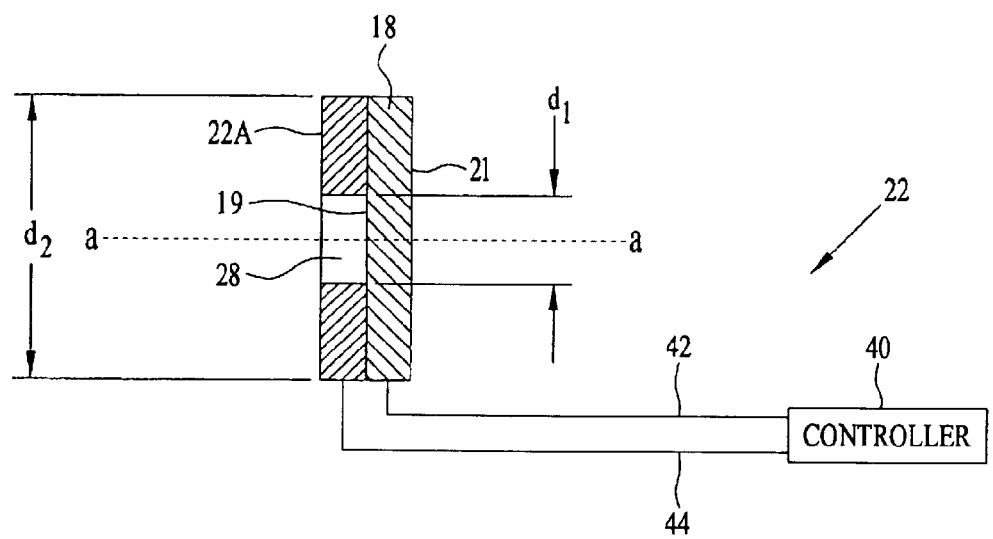
FIG. 3 shows an embodiment of a dye laser that includes a solid-state gain element having one side that abuts a thermoelectric cooling element.

An example of a cooling system 22 is shown in FIG. 3 to include thermoelectric cooling element 22A, controller 40, and signal lines 42 and 44. Thermoelectric cooling element 22A may be positioned in thermal contact with only the first side 19 of gain element 18 by suitable means, such as mechanical fasteners, clamps, or by adhesive bonding. Thermoelectric cooling element 22A may absorb heat energy from gain element 18 under the supervision of controller 40 which senses the temperature of gain element 18 via signal line 42. In this embodiment, when the temperature of gain element 18 exceeds a predetermined threshold, controller 40 provides electrical power to thermoelectric cooling element 22A via power line 44. When the thermoelectric cooling element 22A is thus powered, the well known Peltier effect causes the temperature of thermoelectric cooling element 22A to be reduced, and thereby absorb heat energy from gain element 18 to control and thereby limit the temperature of gain element 18. In FIG. 3, thermoelectric element 22A is shown in a cross-sectional view, by way of example, as having an aperture 28 generally centered about optical axis a—a . The diameter $d_1$ of aperture 28 is generally small compared to the diameter $d_2$ of gain element 18 in applications wherein gain element 18 is implemented as having a disk ring-shape to maximize the surface contact area between gain element 18 and the cooling element 22A. For example, in one embodiment, $d_2 < d_2/10$. However, the diameter $d_2$ of aperture 28 cannot be so small relative to the resonator mode diameter $d_3$ (See FIG. 1) optical signal 36 that serious diffraction losses of optical signal 36 occur. For example, $d_2$ should be at least 50 to 100 times $d_3$.

Figure 2:
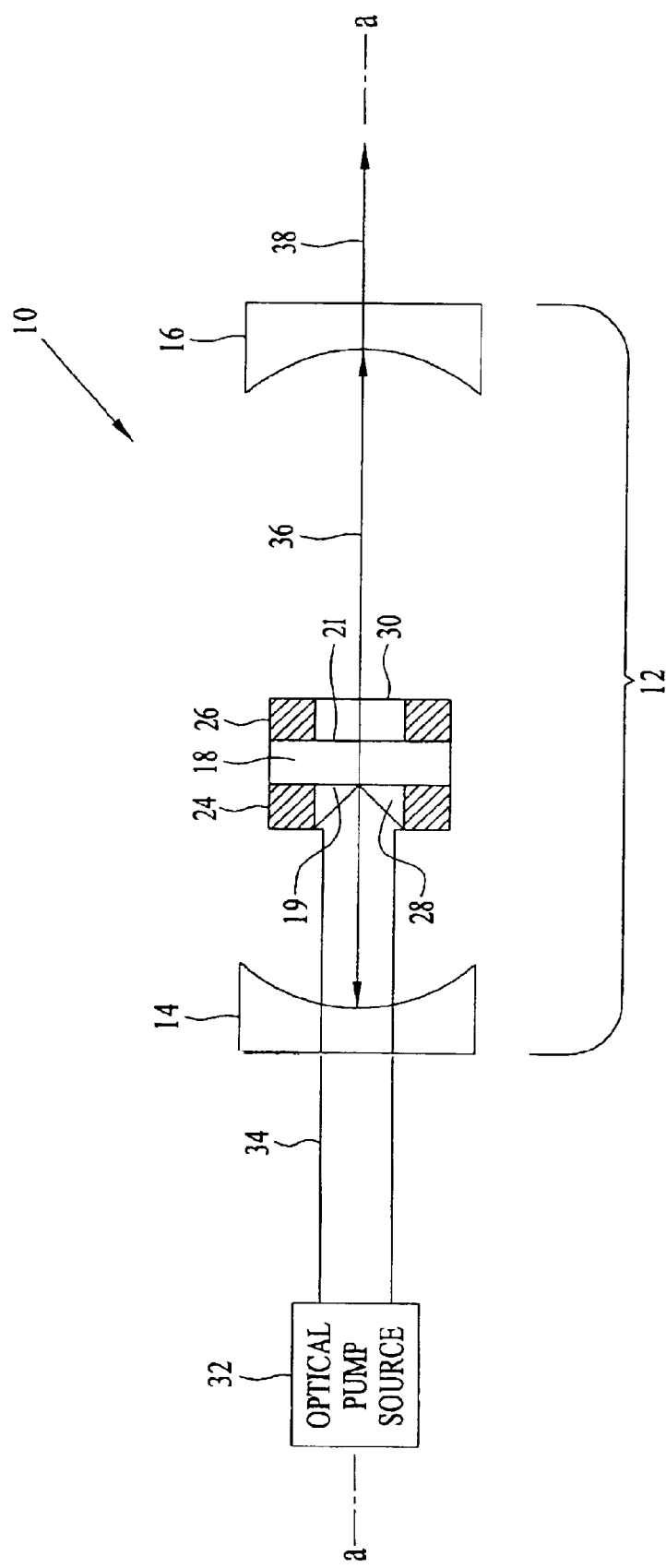
FIG. 2 shows an embodiment of a dye laser that includes a solid-state gain element having two sides that each abut a cooling element.
Figure 4:
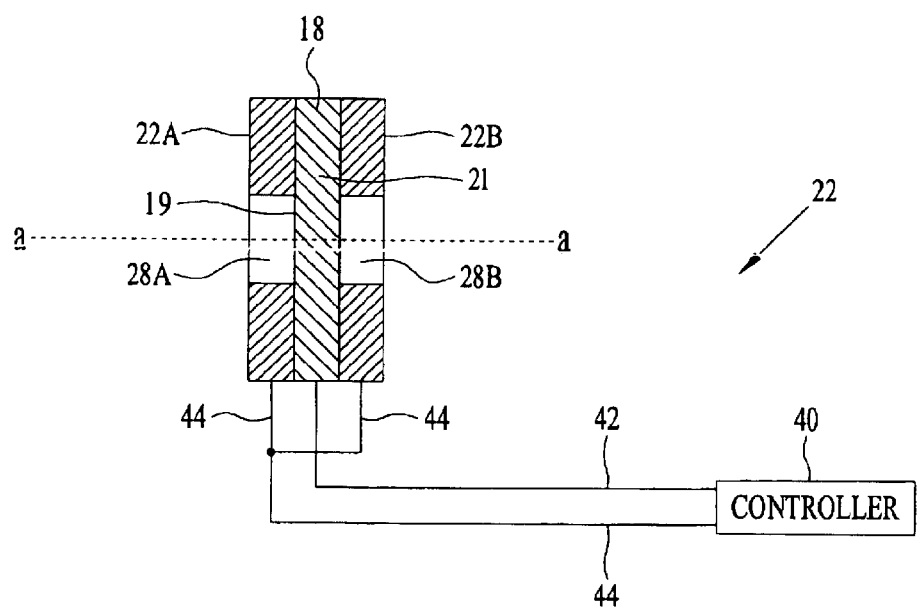
FIG. 4 shows an embodiment of a dye laser that includes a solid-state gain element having two sides that each abut a thermoelectric cooling element.

An example of a cooling system 22 is shown in FIG. 4 to include thermoelectric cooling elements 22A and 22B, controller 40, and signal lines 42 and 44. Thermoelectric cooling elements 22A and 22B are in thermal contact with the first and second sides 19 and 21, respectively, of gain element 18. Cooling elements 22A and 22B remove heat energy from gain element 18 under the supervision of controller 40 which senses the temperature of gain element 18 via signal line 42. In one exemplary mode of operation, when the temperature of gain element 18 exceeds a predetermined threshold, controller 40 provides electrical power to thermoelectric elements 22A and 22B via power line 44. When thermoelectric cooling elements 22A and 22B are thus powered, the Peltier effect, causes the temperature of cooling elements 22A and 22B to be reduced, and thereby remove heat energy from gain element 18. Thus, cooling system 22 in conjunction with the thin depth of gain element 18 may be employed to control and limit the adverse thermal effects that might otherwise be produced in gain element 18 by high power pumping produced by optical pump energy 34. In FIG. 4, thermoelectric elements 22A and 22B are shown in a cross-sectional view, by way of example, as each having an aperture 28A and 28B, respectively, generally centered about optical axis a—a . Thermoelectric cooling elements 22A and 22B may be configured in suitable shapes that conform to the contact areas, such as sides 19 and 21 of gain element 18, as shown in FIG. 2.

Figure 5:
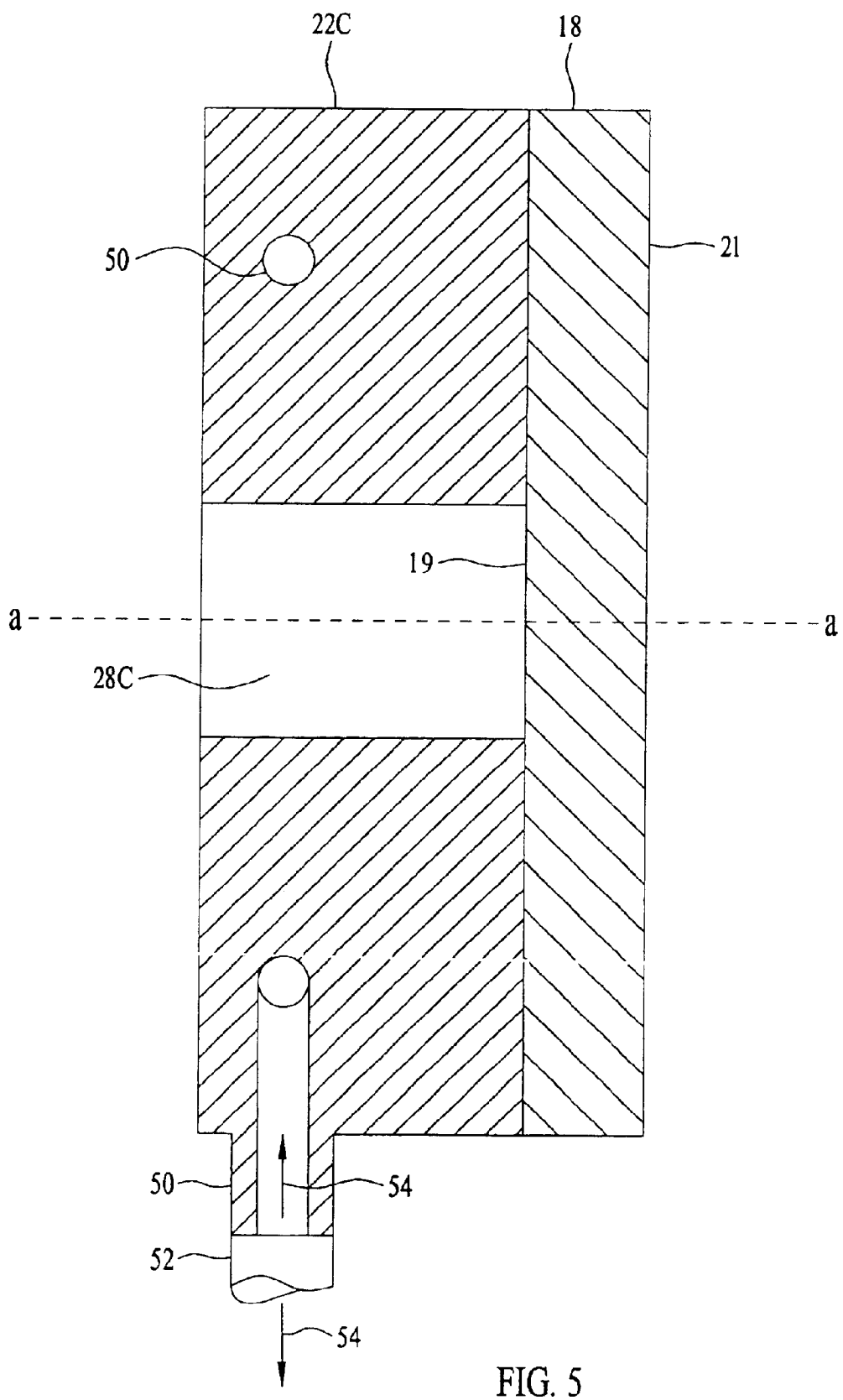
FIG. 5 shows a solid-state gain element that abuts a cooling element implemented as a liquid heat exchanger.

In another embodiment, as shown in FIG. 5, cooling element 22C is in thermal contact with the surface 19 of gain element 18 in order to effectuate heat transfer from the gain element to the cooling element. Cooling element 22C is a liquid heat exchanger having an inlet tube 50 and an outlet tube 52. Cooling fluid 54 having a temperature $T_1$ enters inlet tube 50 and removes heat from gain element 18 as cooling fluid 54 circulates through cooling element 22C. Heated cooling fluid 54 having a temperature $T_2$ exits cooling element 22C through outlet tube 52, where $T_2 > T_1$. In another embodiment, liquid heat exchangers such as cooling element 22C may be in thermal contact with each of sides 19 and 21 of gain element 18.

In one embodiment optical pump source 32 may be implemented as a doubled neodymium-doped yttrium aluminum garnet (Nd:YAG) laser source that generates a green optical pump energy 34 having a wavelength $\lambda_1$ centered at about 532 nanometers, and gain element 18 may consist of a plastic host such as MPMMA in which rhodoamine 700 dye is dissolved so as to transform optical pump energy 34 into an optical signal 34 having a wavelength in the range of about 710–760 nanometers.

Obviously, many modifications and variations of the chemical detection sensor system described herein are possible in light of the above teachings. It is therefore to be understood that within the scope of the appended claims, the chemical detection sensor system may be practiced otherwise than as specifically described.

I claim:

1. A laser, comprising:
   a first optically reflective element;
   a second optically reflective element opposed to and aligned with said first optically reflective element to define a laser cavity having an optical axis;
   an optical pump source for injecting optical pump energy into said laser cavity along said optical axis
   a thin solid-state dye gain element having a host material in which a dye is dissolved that is interposed between said first and second optically reflective elements along said optical axis for transforming said optical pump energy into a resonant optical signal, wherein said dye gain element has a thickness in the range of about 100 to about 1000 microns; and
   a cooling element in thermal contact with said solid-state dye gain element for controlling the temperature of said solid-state dye gain element.

2. The laser of claim 1 wherein said host material is selected from the group that includes porous glass, plastic, and sol-gels.

3. The laser of claim 2 wherein said plastic consists essentially of modified polymethyl methacrylate.

4. The laser of claim 1 wherein said cooling element is a thermoelectric device.

5. The laser of claim 4 wherein said thermoelectric device includes an aperture through which said optical axis passes.

6. The laser of claim 1 wherein said cooling element is a liquid heat exchanger for absorbing said heat energy.

7. A laser, comprising:

a first optically reflective element;

a second optically reflective element opposed to and aligned with said first optically reflective element to define a laser cavity having an optical axis;

an optical pump source for injecting optical pump energy into said laser cavity along said optical axis a thin solid-state dye gain element having first and second sides, and a host material in which a dye is dissolved, and which is interposed between said first and second optically reflective elements along said optical axis for transforming said optical pump energy into a resonant optical signal, wherein said dye gain element has a thickness in the range of about 100 to about 1000 microns; and cooling elements that abut said first and second sides of said solid-state dye gain element for absorbing heat energy from said solid-state dye gain element to control the temperature of said solid-state dye gain element.

8. The laser of claim 7 wherein said host material is selected from the group that includes porous glass, sol-gel, and plastic.

9. The laser of claim 8 wherein said plastic consists essentially of modified polymethyl methacrylate.

10. The laser of claim 7 wherein said cooling elements each are thermoelectric devices.

11. The laser of claim 10 wherein said thermoelectric devices each have an aperture through which said optical axis passes.

12. The laser of claim 7 wherein said cooling elements are liquid heat exchangers.

* * * * *